United States Patent Office 3,178,474
Patented Apr. 13, 1965

3,178,474
HYDROLYSIS OF PYRROLIDONE CARBOXYLIC ACID
Harold L. Fike, Mount Prospect, Ill., assignor to International Minerals & Chemical Corporation, a corporation of New York
No Drawing. Filed Nov. 28, 1960, Ser. No. 71,882
4 Claims. (Cl. 260—534)

The present invention generally relates to the hydrolysis of pyrrolidone carboxylic acid (PCA), the anhydride of glutamic acid (GA). In a specific aspect it relates to the hydrolysis of pyrrolidone carboxylic acid with a strong acid.

Monosodium glutamate is widely used in the food industry as a seasoning. Monosodium glutamate has been produced from vegetable waste liquors, such as Steffen's filtrate, and fermentation and synthetic processes are currently of commercial interest. In these processes, especially in the fermentation and synthetic processes, concentrated pyrrolidone carboxylic acid is obtained as an intermediate which is hydrolyzed to form glutamic acid and the glutamic acid is then converted to monosodium glutamate.

In the prior art processes for hydrolyzing pyrrolidone carboxylic acid to form glutamic acid, relatively large amounts of dilute acid are utilized to effect the hydrolysis. It has now been discovered, and the present invention is partly based on this discovery, that effective hydrolysis may be achieved when the amount of water is limited.

Accordingly, it is an object of the present invention to provide a novel process for the hydrolysis of pyrrolidone carboxylic acid.

It is a further object of the invention to provide a novel process for the acid hydrolysis of pyrrolidone carboxylic acid in which limited amounts of water are used to effect a high degree of hydrolysis.

It is a specific object of the invention to provide a novel process for the hydrolysis of pyrrolidone carboxylic acid with hydrochloric acid.

These and other objects and advantages of the present invention will be apparent from the description of the invention.

Generally described, the present invention comprises effecting hydrolysis of pyrrolidone carboxylic acid at a $H_2O/PCA$ mole ratio below about 22.

As hereinbefore set forth the prior art teaches the hydrolyzing of pyrrolidone carboxylic acid to form glutamic acid by an acid hydrolysis. The prior art processes, however, used relatively large amounts of water and acid to effect the hydrolysis. The hydrolysis of pyrrolidone carboxylic acid may be represented by the following equation $$PCA + H_2O + HCl \rightarrow GA \cdot HCl$$

From this equation it would be expected that a greater degree of hydrolysis of pyrrolidone carboxylic acid would be effected by larger amounts of water and acid. It has, however, now been determined that a hydrolysis of at least 90% may be effected using substantially the stoichiometric amount of acid when the hydrolysis is conducted at a $H_2O/PCA$ mole ratio below about 22 and preferably below about 20. When the ratio is increased to above 22 the degree of hydrolysis is decreased which is entirely unexpected from the equation.

In order to effect a hydrolysis of at least 90%, the amount of water used must, of course, be at least 90% of the stoichiometric amount required for hydrolysis. It is preferred that about the stoichiometric amount be utilized, that is a $H_2O/PCA$ mole ratio of at least about 1 is preferred. The mole ratio of $H_2O/PCA$ is, however, below about 22, since at ratios above this the degree of hydrolysis drops off and less than 90% hydrolysis is obtained. The preferred range of the mole ratio of $H_2O/PCA$ is, therefore, from about 1 to about 22.

Any suitable acid may be used to effect the hydrolysis. Sulfuric acid, phosphoric acid, trichloroacetic acid, or other strong acid, preferably hydrogen chloride is used. The acid is preferably non-oxidizing at the conditions at which the hydrolysis is effected.

An amount of acid of at least 90% of the stoichiometric amount is, of course, needed to effect at least 90% hydrolysis. It is preferred that about the stoichiometric amount of acid be utilized, that is an acid/pyrrolidone carboxylic acid mole ratio of at least about 1 is preferred. When conducting the hydrolysis of pyrrolidone carboxylic acid in accordance with this invention, at least 90% hydrolysis is effected when using substantially the stoichiometric amount of acid. Greater amounts of acid may, of course, be used, however, greater amounts are not necessary. Further, an amount of acid greater than that required to achieve optimum results is usually economically impractical. Still further, when substantially the stoichiometric amount is used, it is not necessary to remove excess acids. The mole ratio of acid/pyrrolidone carboxylic acid is preferably below 5, more preferably below about 1.5 and still more preferably is about the stoichiometric amount. The process of the present invention effects a 90% hydrolysis when using amounts of acid which are below the amounts used in the prior art processes. The present invention, therefore, affords this economic advantage over the prior art processes.

The hydrolysis reaction may be conducted in any suitable manner and at suitable hydrolyzing conditions which are generally well known in the art. In one embodiment an aqueous acid is admixed with the pyrrolidone carboxylic acid. In another embodiment gaseous HCl and steam are passed through a body of pyrrolidone carboxylic acid. Other methods of contacting the pyrrolidone carboxylic acid with water and acid will be obvious to those skilled in the art. The temperature at which the hydrolysis is effected is preferably above about 0° C. and ambient temperatures may be employed. The temperature is preferably below that at which any substantial decomposition of the reactants or reactant products is obtained. In general, temperatures below about 100° C. have produced the desired results. Temperatures above 100° C. may be employed when superatmospheric pressures are used to maintain a liquid water phase.

The product of the hydrolysis is the acid salt of glutamic acid. Methods for the recovery of glutamic acid from these glutamic acid salts are well known to the art. One known method for recovering glutamic acid from $GA \cdot HCl$ is to heat the $GA \cdot HCl$ to volatilize the HCl. Another method is to adjust the pH of a concentrated aqueous solution of $GA \cdot HCl$ to about 3.2, at which pH glutamic acid crystals precipitate.

In order to give a fuller understanding of the invention but with no intention to be limited thereto, the following specific example is given.

EXAMPLE

Pyrrolidone carboxylic acid is hydrolyzed in a series of tests in which 25.8 grams (0.2 moles) of D,L pyrrolidone carboxylic acid is placed in an Erlenmeyer flask with 19.7 grams of 37% hydrochloric acid (0.2 moles of HCl) and water. The amount of water was varied from test to test to determine the effect of water on the hydrolysis. In each test the Erlenmeyer flask containing the mixture of pyrrolidone carboxylic acid, water and HCl was capped to prevent evaporation, and heated in an electric oven at 90° C. for 6 hours. The hydrolyzed product was then analyzed to determine the degree of hydrolysis, or conversion of pyrrolidone carboxylic acid to GA·HCl. The results of these tests are given below in the table.

Table

| Test | Moles | | | Mole Ratio | | Percent Hydrolysis |
|---|---|---|---|---|---|---|
| | HCl | PCA | H₂O | HCl/PC | H₂O/PC | |
| 1 | 0.2 | 0.2 | 18.7 | 1 | 93.5 | 72 |
| 2 | 0.2 | 0.2 | 8.36 | 1 | 41.8 | 83 |
| 3 | 0.2 | 0.2 | 5.27 | 1 | 26.4 | 86 |
| 4 | 0.2 | 0.2 | 3.26 | 1 | 16.3 | 92 |
| 5 | 0.2 | 0.2 | 2.04 | 1 | 10.2 | 93 |
| 6 | 0.2 | 0.2 | 1.36 | 1 | 6.8 | 95 |
| 7 | 0.2 | 0.2 | 0.87 | 1 | 4.3 | 97 |

Results given in the table illustrate that a hydrolysis of pyrrolidone carboxylic acid of at least 90% may be effected when the H₂O/PC mole ratio is below about 22. Further, this degree of hydrolysis may be effected when using the stoichiometric amount of acid although greater amounts may be used when desired. Since the amount of water used is below that of the prior art processes, the extensive concentrating and evaporating equipment required by the prior art processes are not necessary which affords another economic advantage.

The description of the invention utilized specific reference to certain process details; however, it is to be understood that such details are illustrative only and not by way of limitation. Other modifications and equivalents of the invention will be apparent to those skilled in the art from the foregoing description.

I claim:
1. In the process of acid hydrolyzing pyrrolidone carboxylic acid by reacting acid and pyrrolidone carboxylic acid in water under hydrolyzing conditions, the improvement of establishing a mole ratio of water/pyrrolidone carboxylic acid of from about 0.9 to about 22 and an acid/pyrrolidone carboxylic acid mole ratio of from about 0.9 to about 5.
2. In the process of acid hydrolyzing pyrrolidone carboxylic acid by reacting acid and pyrrolidone carboxylic acid in water under hydrolyzing conditions, the improvement of establishing a water/pyrrolidone carboxylic acid mole ratio of from about 1 to about 20 and an acid/pyrrolidone carboxylic acid mole ratio of from about 0.9 to about 1.5.
3. The improvement of claim 1 wherein the acid is hydrochloric acid.
4. The improvement of claim 1 wherein the acid is sulfuric acid.

References Cited by the Examiner
UNITED STATES PATENTS

| 2,828,336 | 3/58 | Gaver et al. | 260—534 |
| 2,929,839 | 3/60 | Hoglan | 260—534 |
| 2,984,684 | 5/61 | Fike | 260—534 |

LORRAINE A. WEINBERGER, *Acting Primary Examiner.*

LEON ZITVER, CHARLES B. PARKER, *Examiners.*